(12) United States Patent
Daniel

(10) Patent No.: US 11,796,149 B2
(45) Date of Patent: Oct. 24, 2023

(54) VEHICLE LIGHT UNIT

(71) Applicant: VALEO VISION, Bobigny (FR)

(72) Inventor: Thomas Daniel, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 17/783,151

(22) PCT Filed: Nov. 30, 2020

(86) PCT No.: PCT/EP2020/083961
§ 371 (c)(1),
(2) Date: Jun. 7, 2022

(87) PCT Pub. No.: WO2021/115828
PCT Pub. Date: Jun. 17, 2021

(65) Prior Publication Data
US 2023/0017881 A1 Jan. 19, 2023

(30) Foreign Application Priority Data

Dec. 10, 2019 (FR) ...................................... 1914012

(51) Int. Cl.
*F21S 41/50* (2018.01)
(52) U.S. Cl.
CPC ..................................... *F21S 41/50* (2018.01)
(58) Field of Classification Search
CPC ....................................................... F21S 41/50
See application file for complete search history.

(56) References Cited

U.S. PATENT DOCUMENTS

2013/0314935 A1 11/2013 Tokieda et al.
2015/0211702 A1 7/2015 Delourme et al.

FOREIGN PATENT DOCUMENTS

| DE | 102014110348 A1 | 1/2016 |
| EP | 1270319 A2 | 1/2003 |
| EP | 2899068 A1 | 7/2015 |
| EP | 3069966 A1 | 9/2016 |
| FR | 3040667 A1 | 3/2017 |
| GB | 2451125 A | 1/2009 |
| WO | 2015001823 A1 | 1/2015 |

OTHER PUBLICATIONS

European Patent Office, International Search Report (with English translation) and Written Opinion of corresponding International Application No. PCT/EP2020/083961, dated Feb. 3, 2021.

*Primary Examiner* — Thomas M Sember
(74) *Attorney, Agent, or Firm* — Valeo Vision

(57) ABSTRACT

The invention relates to a vehicle light unit with a primary light device including a primary light module arranged in a primary housing, a secondary light device including a secondary light module arranged in a secondary housing, a primary part with a first portion and a second portion, the second portion being transparent, a secondary part with a first portion and a second portion, the second portion being transparent, and a logo. One of the primary part or secondary part includes an indexing device to position the primary part or secondary part relative to the other part with one of the primary part or secondary part partially overlapping the other part. The light unit further including a mounting surface for the logo with the mounting surface including an attachment device for attachment to one of the primary part or secondary part.

14 Claims, 15 Drawing Sheets

VEHICLE LIGHT UNIT

CROSS-REFERENCE TO RELATED APPLICATIONS

This application is filed under 35 U.S.C. § 371 U.S. National Phase of International Application No. PCT/EP2020/083961 filed Nov. 30, 2020 (published as WO2021115828), which claims priority benefit to French application No. 1914012 filed on Dec. 10, 2019, the disclosures of which are herein incorporated by reference in their entirety.

TECHNICAL FIELD

The present invention relates to a light assembly of a vehicle. It finds a particular but nonlimiting application in motor vehicles.

BACKGROUND OF THE INVENTION

In the field of motor vehicles, a light assembly of a vehicle known to those skilled in the art comprises two headlights and a strip on the headlights of the vehicle so as to obtain a one-piece visual appearance. To form the strip, three parts are used.

BRIEF SUMMARY OF THE INVENTION

A drawback of this prior art is that of correctly fitting the three parts together while taking account of the mechanical clearances.

In this context, the present invention aims to propose a light assembly of a vehicle which makes it possible to solve the drawback mentioned.

To this end, the invention proposes a light assembly of a vehicle, said light assembly comprising:
 a primary light device comprising a primary light module arranged in a primary housing,
 a secondary light device comprising a secondary light module arranged in a secondary housing,
 a primary component comprising a first part and a second part, said second part being transparent,
 a secondary component comprising a first part and a part, said second part being transparent,
 a logo, characterized in that:
 one of said primary component (16) or secondary component (17) comprises an indexing device (190) configured to position one of said primary component (16) or secondary component (17) relative to the other of said secondary component (17) or primary component (16),
 one of said primary component (16) or secondary component (17) partially covering the other of said primary component (16) or secondary component (17),
 said light assembly further comprises a mounting surface for said logo and said mounting surface comprises a fixing device for fixing to one of said primary component or secondary component.

According to nonlimiting embodiments, said light assembly may further comprise one or more additional features taken alone or according to any technically possible combinations, among the following.

According to one nonlimiting embodiment:
 the first part of the primary component is opaque, semi-opaque or transparent,
 the first part of the secondary component is opaque, semi-opaque or transparent.

According to one nonlimiting embodiment, said indexing device is a male part configured to be inserted into a female part, or vice versa.

According to one nonlimiting embodiment, the male part is a closed well, and the female part is a stud.

According to one nonlimiting embodiment, the first part and the second part are overmolded. They are overmolded by two-shot injection molding.

According to one nonlimiting embodiment, said light assembly further comprises a primary style mask and a secondary style mask configured to be assembled respectively on said primary light module and on said secondary light module According to one nonlimiting embodiment, said light assembly further comprises a primary style part and a secondary style part configured to be fastened respectively to said primary component and to said secondary component.

According to one nonlimiting embodiment, said light assembly further comprises an indexing device for indexing on the body of the vehicle.

According to one nonlimiting embodiment, one of said primary component or secondary component comprises said mounting surface for said logo.

According to one nonlimiting embodiment, said mounting surface comprises said indexing device for indexing on the body of the vehicle.

According to one nonlimiting embodiment, said light assembly further comprises a central structural part comprising said mounting surface for said logo.

According to one nonlimiting embodiment, said central structural part comprises said indexing device for indexing on the body of the vehicle.

According to one nonlimiting embodiment, said primary light device and said secondary light device are vehicle front headlights or vehicle taillights.

BRIEF DESCRIPTION OF THE DRAWINGS

The invention and its various applications will be better understood on reading the following description and on examining the accompanying figures.

DETAILED DESCRIPTION OF THE INVENTION

Figure 1:
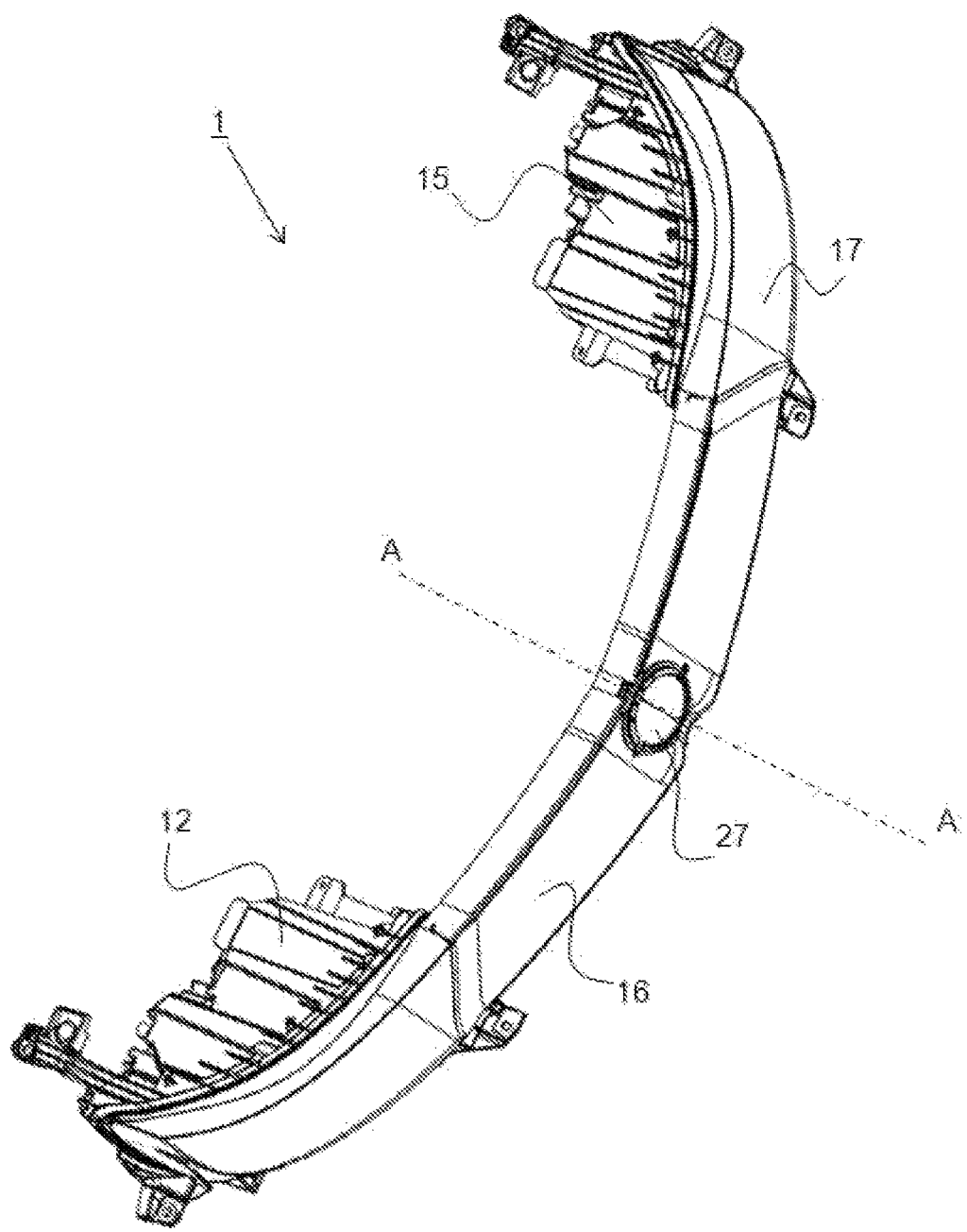
FIG. 1 is a perspective view of a light assembly of a vehicle, said light assembly comprising a first light device with a primary module, a second light device with a secondary module, a strip formed by a primary component and a secondary component, a logo, and a mounting surface for the logo, according to one nonlimiting embodiment of the invention.

Identical elements, by structure or by function, appearing in different figures retain, unless otherwise specified, the same references.

The light assembly 1 of a vehicle according to the invention is described with reference to FIGS. 1 to 16. In one nonlimiting embodiment, the vehicle is a motor vehicle. Motor vehicle means any type of motorized vehicle. This embodiment is taken as a nonlimiting example in the remainder of the description. In the remainder of the description, the vehicle is thus otherwise called a motor vehicle.

As illustrated in FIG. 2a and FIG. 2b or FIG. 3 and FIG. 12, the light assembly 1 of a vehicle comprises:
- a primary light device 10 comprising a primary light module 11 (illustrated in FIG. 2a and FIG. 2b) arranged in a primary housing 12,
- a secondary light device 13 comprising a secondary light module 14 (illustrated in FIG. 2a and FIG. 2b) arranged in a secondary housing 15,
- a primary component 16,
- a secondary component 17,
- a logo 27, and
- a mounting support 28 for said logo 27.

In one nonlimiting embodiment, the primary light device 10 and the secondary light device 13 are front headlights of the vehicle. In one illustrated nonlimiting example, the primary light device 10 is the right front headlight of the vehicle, and the secondary light device 13 is the left front headlight of the vehicle. In another nonlimiting embodiment, the primary light device 10 and the secondary light device 13 are taillights of the vehicle. In one nonlimiting example that has not been illustrated, the primary light device 10 is the right taillight of the vehicle, and the secondary light device 13 is the left taillight of the vehicle.

Figure 2A:
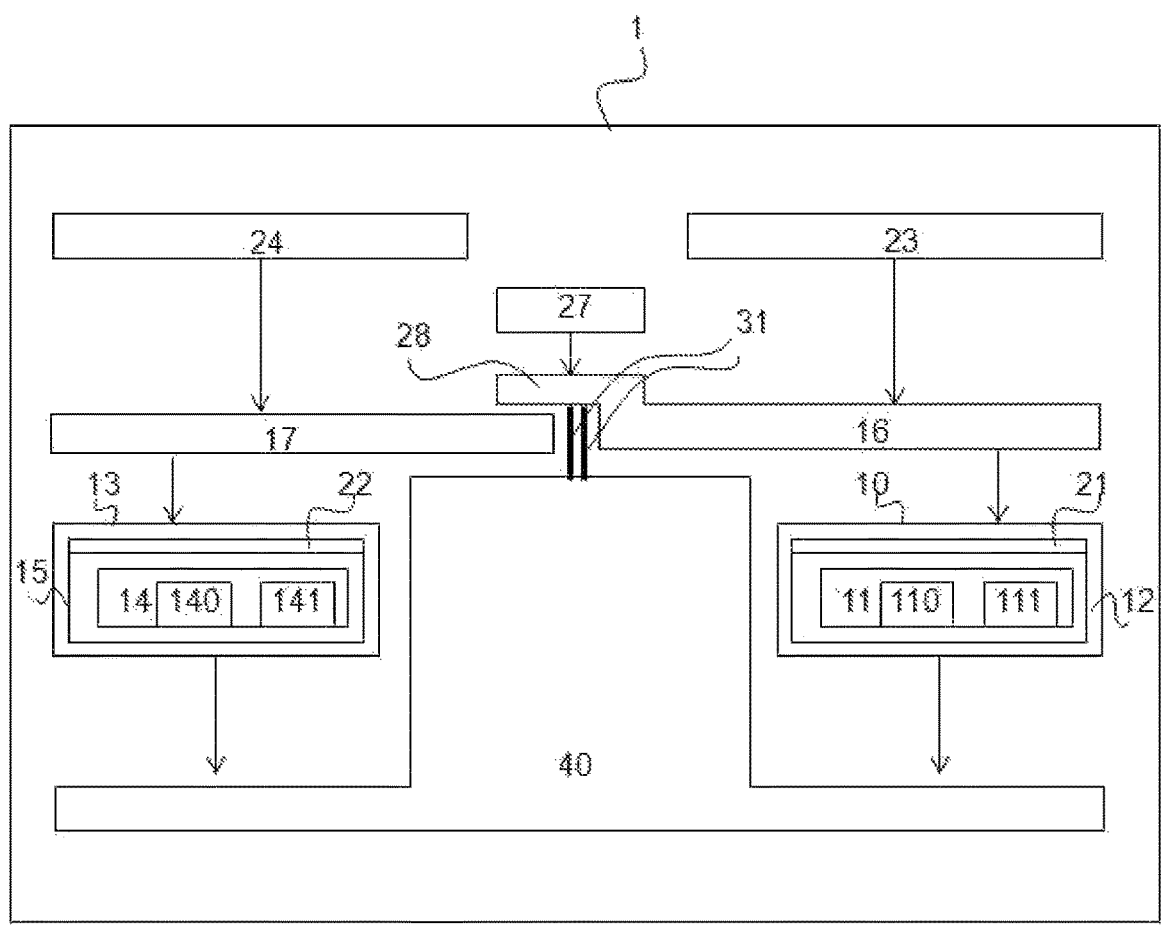
FIG. 2a illustrates a diagram of said light assembly of FIG. 1, according to a first nonlimiting embodiment.
Figure 2B:
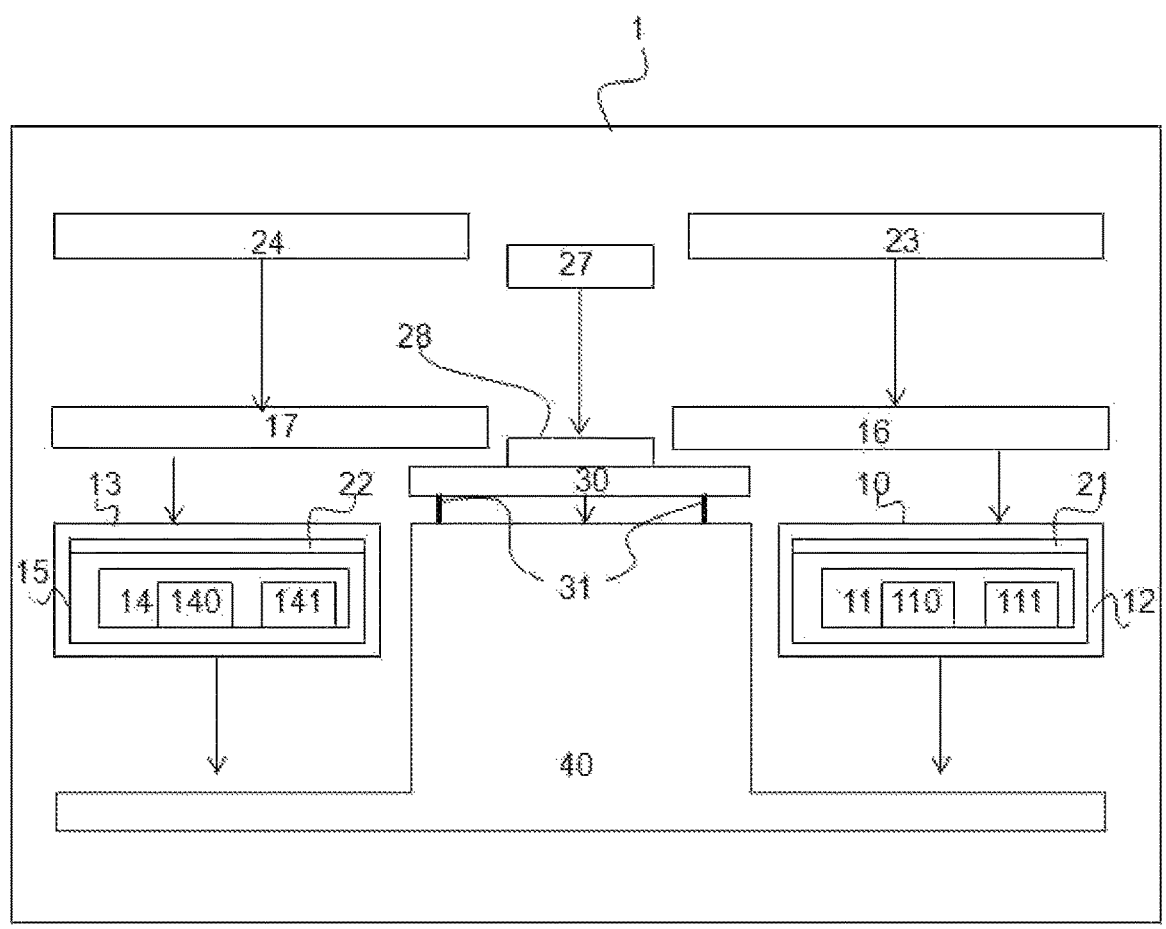
FIG. 2b illustrates a diagram of said light assembly of FIG. 1, according to a second nonlimiting embodiment.

As illustrated in FIG. 2a and FIG. 2b, the primary light module 11 and the secondary light module 14 each further comprise at least one light source referenced respectively 110, 140 in FIG. 2a and FIG. 2b. The primary light module 11 and the secondary light module 14 each generate a light beam (not illustrated) making it possible to perform a light function corresponding to the light device 10 or 13 (headlamp or taillight). In one nonlimiting embodiment, the light source 110, 140 is a semiconductor light source. In one nonlimiting embodiment, said semiconductor light source forms part of a light-emitting diode. By light-emitting diode is meant any type of light-emitting diode, whether, in nonlimiting examples, LEDs ("Light Emitting Diodes"), OLEDs ("organic LEDs"), AMOLEDs (Active-Matrix-Organic LEDs), or FOLEDs (Flexible OLEDs).

As illustrated in FIG. 2a and FIG. 2b, in one nonlimiting embodiment, the primary light module 11 and the secondary light module 14 each further comprise an optical module referenced respectively 111, 141 such as, in nonlimiting examples, a reflector, a lens or a light guide. It may comprise a plurality of reflectors, or lenses, or light guides.

As illustrated in FIG. 2a and FIG. 2b or FIG. 3 and FIG. 12, in one nonlimiting embodiment, the light element 1 further comprises a primary style mask 21 and a secondary style mask 22 configured to be assembled respectively on the primary light module 11 and on the secondary light module 14. They are arranged between the primary light module 11-secondary light module 14 assembly and the primary component 16-secondary component 17 assembly. In one illustrated nonlimiting embodiment, the primary style mask 21 forms part of the primary light device 10. The secondary style mask 22 forms part of the secondary light device 13.

As illustrated in FIG. 2a and FIG. 2b or FIG. 3 and FIG. 12, in one nonlimiting embodiment, the light element 1 further comprises a primary style part 23 and a secondary style part 24 configured to be fastened respectively to said primary component 16 and to said secondary component 17. In one nonlimiting example, the primary style part 23 and the secondary style part 24 are chrome-plated. The primary style part 23 and the secondary style part 24 respectively comprise a series of fixing lugs 230 and 240 to fix them respectively to said primary component 16 and to said secondary component 17.

Figure 13:
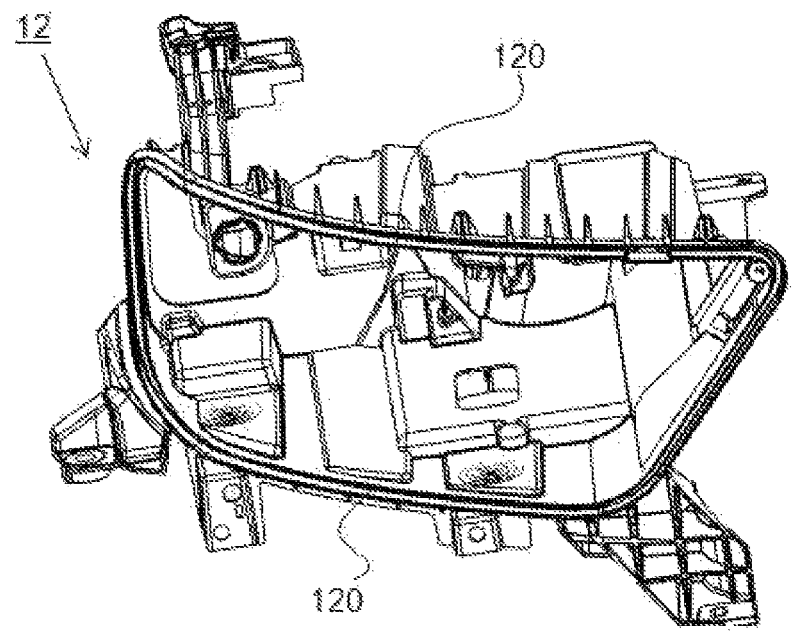
FIG. 13 is a zoomed-in view of a primary housing configured to accommodate the primary light module of said light assembly of FIG. 2a or FIG. 2b, and of a secondary housing configured to accommodate the secondary light module of said light assembly of FIG. 3 or FIG. 12, according to one nonlimiting embodiment.
Figure 13:
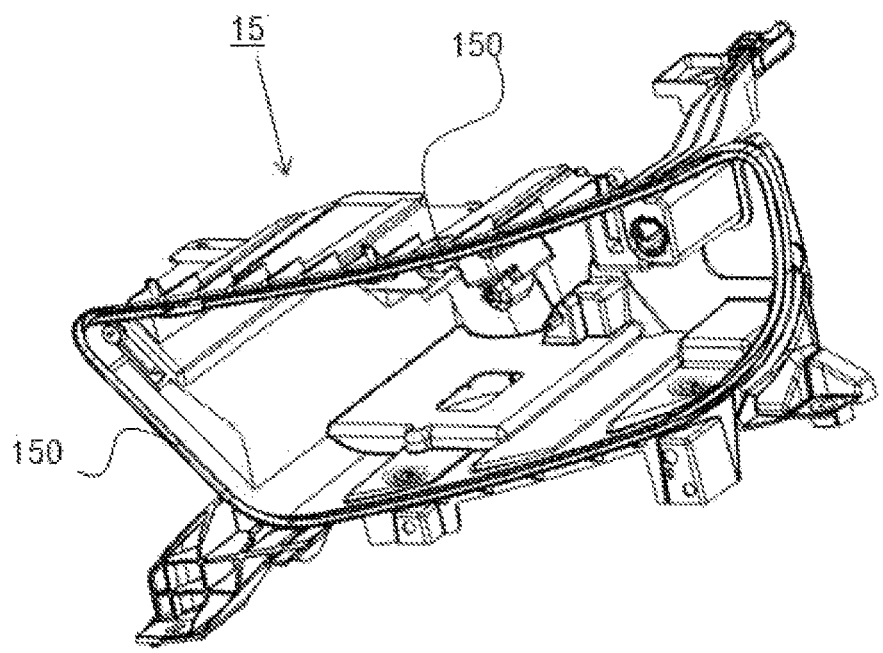

As illustrated in FIG. 13, the primary housing 12 comprises an adhesive bonding groove 120 for adhesively bonding all or part of the primary component 16. The adhesive bonding groove 120 is configured to receive adhesive. The adhesive will crosslink during passage in an oven for said light assembly 1. Thus, in one nonlimiting embodiment, the first part 16a and the second part 16b of the primary component are adhesively bonded to the primary housing 12 via the adhesive housed in the adhesive bonding groove 120. This allows for a good seal.

As illustrated in FIG. 13, the secondary housing 15 comprises an adhesive bonding groove 150 for adhesively bonding all or part of the secondary component 17. The adhesive bonding groove 150 is configured to receive adhesive. The adhesive will crosslink during passage in an oven. Thus, in one nonlimiting embodiment, the first part 17a and the second part 17b of the primary component are adhesively bonded to the secondary housing 15 via the adhesive housed in the adhesive bonding groove 150. This allows for a good seal.

Figure 3:
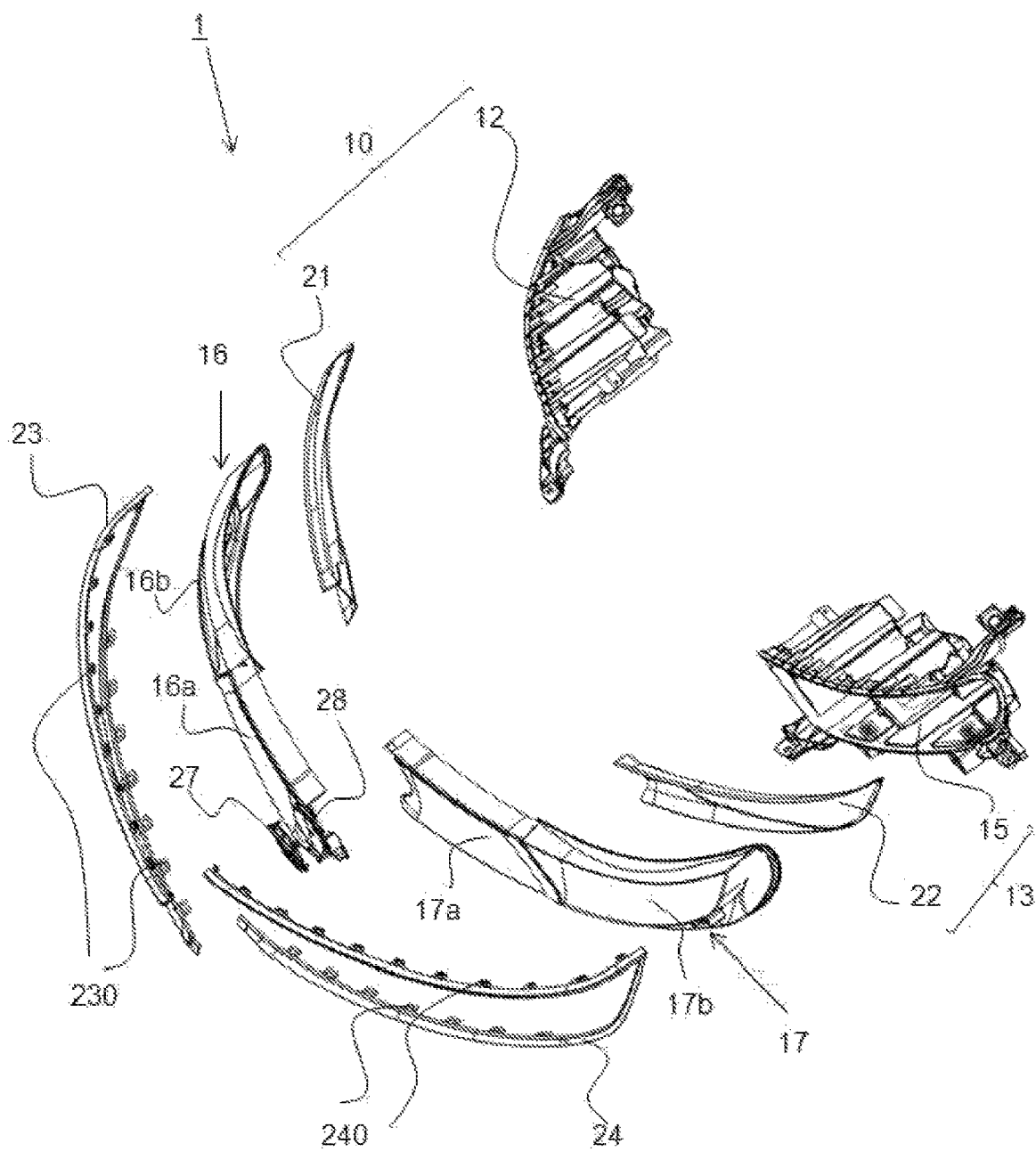
FIG. 3 is an exploded view of said light assembly of FIG. 2a, according to one nonlimiting embodiment.
Figure 4:
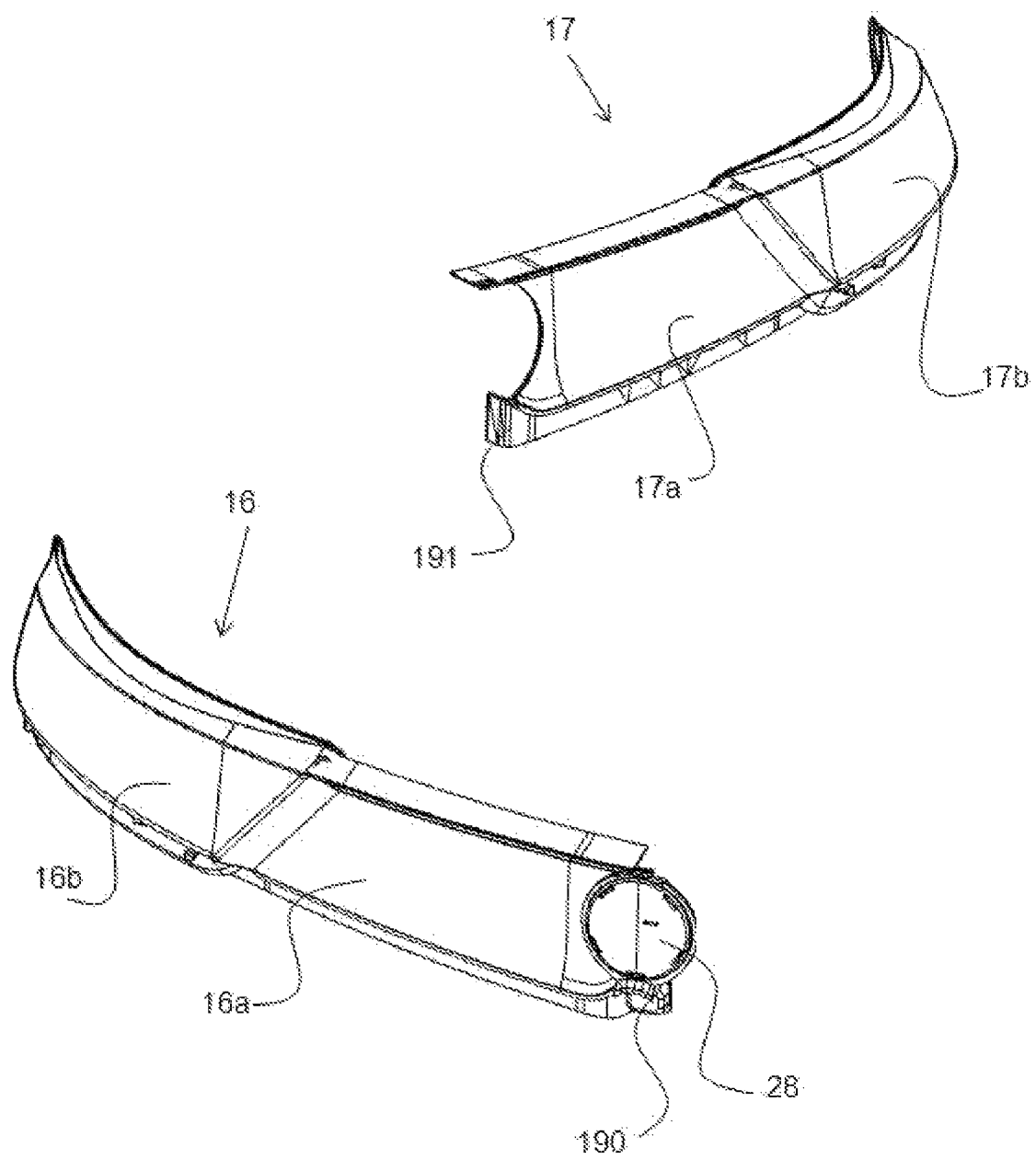
FIG. 4 illustrates said primary component and said one secondary component of said light assembly of FIG. 2a, according to one nonlimiting embodiment.
Figure 5:
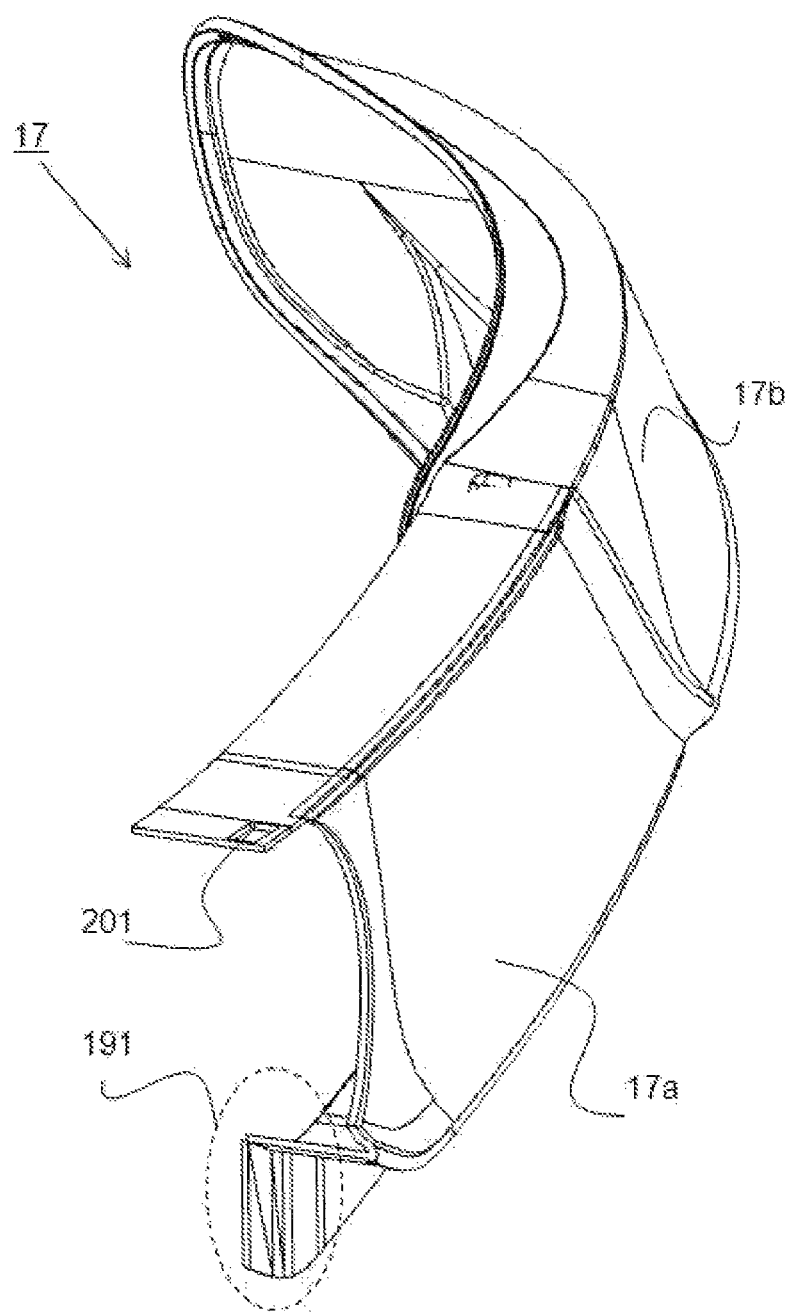
FIG. 5 is a zoomed-in view of said secondary component of FIG. 4, according to one nonlimiting embodiment.
Figure 12:
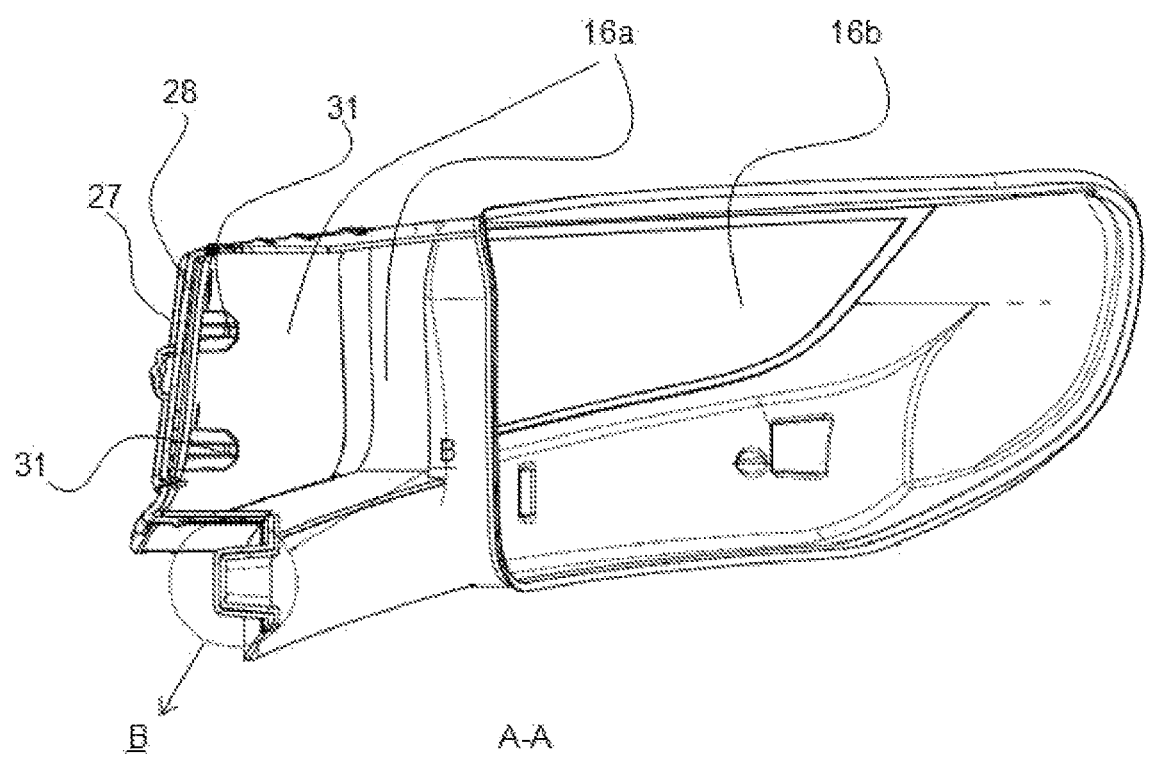
FIG. 12 illustrates a sectional view of the light assembly of FIG. 2a, according to one nonlimiting embodiment.

As illustrated in FIG. 3 and FIG. 12 for example, in one nonlimiting embodiment, the primary component 16 and the secondary component 17 respectively comprise a first part 16*a*, 17*a* and a second part 16*b*, 17*b*.

In one nonlimiting embodiment, the first part 16*a* and the second part 16*b* of the primary component 16 are overmolded. In one nonlimiting embodiment, the first part 17*a* and the second part 17*b* of the secondary component 17 are overmolded. The first part 16*a* and the second part 16*b* of the primary component 16 are overmolded by two-shot injection moulding. The same is true for the first part 17*a* and the second part 17*b* of the secondary component 17. This makes it possible to obtain a single component, namely the primary component 16 or the secondary component 17, and to use only one mold to produce said component. Furthermore, manufacture is faster and less expensive than if it were necessary to assemble the two parts 16*a*, 16*b* of the primary component 16, or 17*a*, 17*b* of the secondary component 17.

In one nonlimiting embodiment, the first part 16*a* of the primary component 16 is opaque, semi-opaque (in one nonlimiting example smoked) or transparent, and the second part 16*b* is transparent. In one nonlimiting embodiment, the first part 17*a* of the secondary component 17 is opaque, semi-opaque (in one nonlimiting example smoked) or transparent, and the second part 17*b* is transparent.

In one nonlimiting example, the first part 16*a* and the first part 17*a* are black in color. In one nonlimiting embodiment, the primary component 16 and the secondary component 17 are made of PC (polycarbonate) or PP (polypropylene). Namely, the first part 16*a* and the second part 16*b* are made of PC, or PP, and the first part 17*a* and the second part 17*b* are made of PC, or PP.

As illustrated in FIG. 3 and FIG. 12, in one nonlimiting embodiment, the primary component 16 is configured to be arranged facing the primary light device 10, namely opposite the right front headlight in the nonlimiting example illustrated; and the secondary component 17 is configured to be arranged facing the secondary light device 13, namely opposite the left front headlight in the nonlimiting example illustrated. In particular, their second part 16*b*, 17*b* which is transparent is arranged respectively opposite the primary light device 10 and the secondary light device 13 so as to respectively allow the light beam generated by the primary light module 11 and the secondary light module respectively 14 to pass.

The primary component 16 and the secondary component 17 are configured to form a strip which covers the primary light device 10 and the secondary light device 14 with a logo 27 in the center of said strip so as to obtain a one-piece visual appearance.

Figure 6:
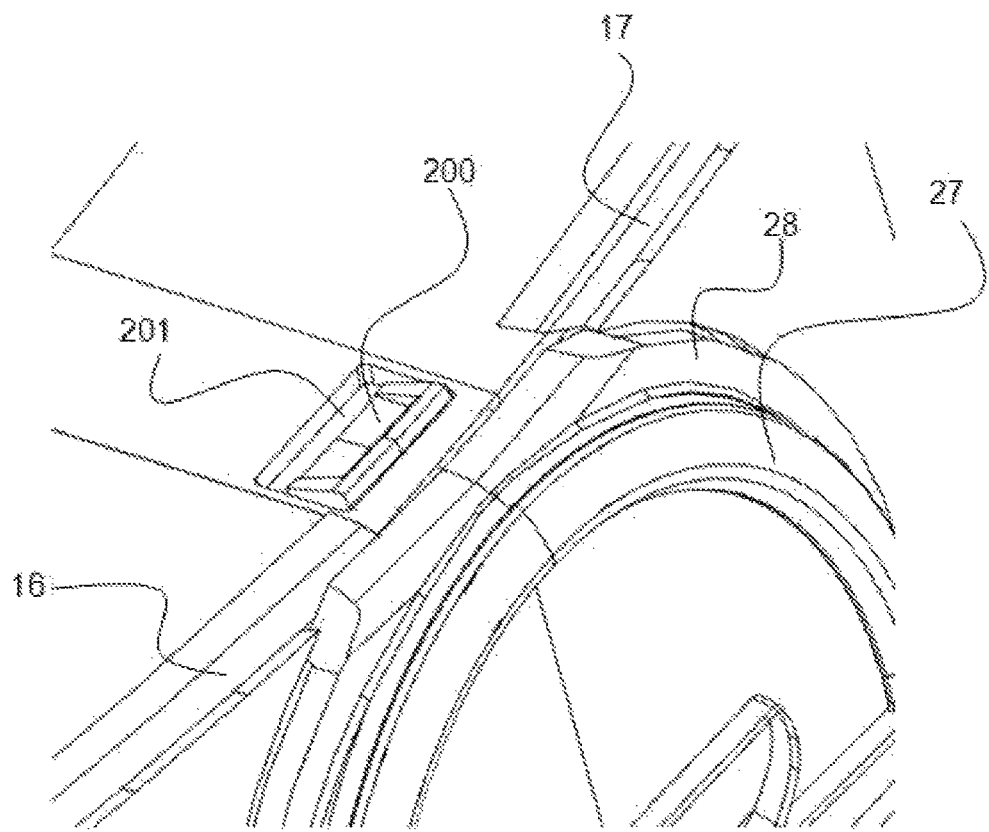
FIG. 6 illustrates a device for fixing a logo support to the secondary component of FIG. 2a and FIG. 2b, according to one nonlimiting embodiment.
Figure 10:
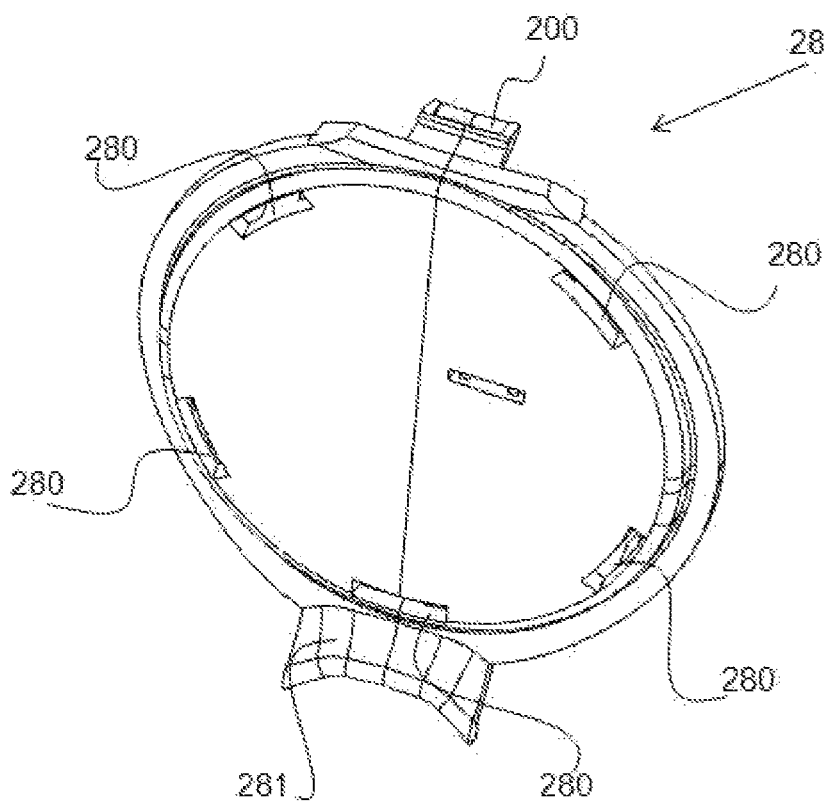
FIG. 10 illustrates the mounting surface for said light assembly of FIG. 2a and FIG. 2b, according to one nonlimiting embodiment.

As illustrated in FIG. 10, the mounting surface 28 for the logo 27 comprises a fixing device 200 for fixing to one of said primary component 16 or secondary component 17. In the nonlimiting example illustrated, the mounting surface 28 for the logo 27 comprises a fixing device 200 for fixing to the secondary component 17. In one nonlimiting example, the fixing device 200 is a fixing lug configured to be inserted into a slot 201 of the secondary component 17, as illustrated in FIG. 6. Thus, the secondary component 17 comprises a counterpart 201 of the fixing device 200. The primary component 16 and the secondary component 17 are thus clipped together.

Figure 9:
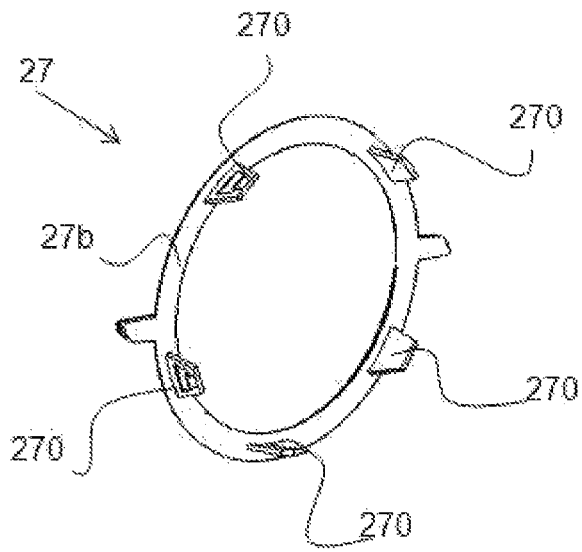
FIG. 9 illustrates a rear face of the logo of the figures of said light assembly of FIG. 2a and FIG. 2b, according to one nonlimiting embodiment.
Figure 11:
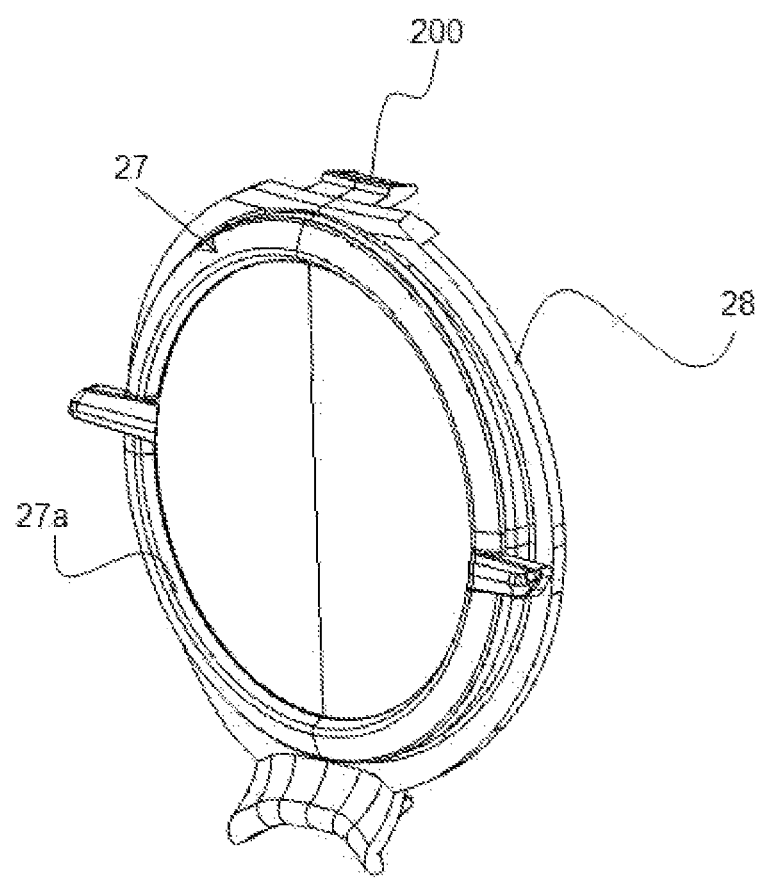
FIG. 11 illustrates the logo of FIG. 9 positioned on the mounting surface of FIG. 10, according to one nonlimiting embodiment.

As illustrated in FIG. 10, the mounting surface 28 comprises one or more slots 280 to receive fixing lugs 270 of the logo 27 to clip the logo 27 on. In the nonlimiting example illustrated, there are five slots. As illustrated in FIG. 9, the logo 27 comprises said fixing lugs 270 on its rear face 27*b*, namely five in the nonlimiting example illustrated. The logo 27 is thus fixed to the mounting surface 28 by means of said fixing lugs 270. FIG. 11 illustrates the front face 27*a* of the logo 27, the latter being positioned on the mounting surface 28. In one nonlimiting embodiment, the mounting surface 28 has a shape relatively similar to the logo 27. In the nonlimiting example, the logo 27 has a circular shape. The mounting surface 28 also has a circular shape.

One of said primary component 16 or secondary component 17 comprises an indexing device 190 for indexing on the other of said primary component 16 or secondary component 17. The indexing device 190 is configured to position the primary component 16 relative to the secondary component 17.

Figure 7:
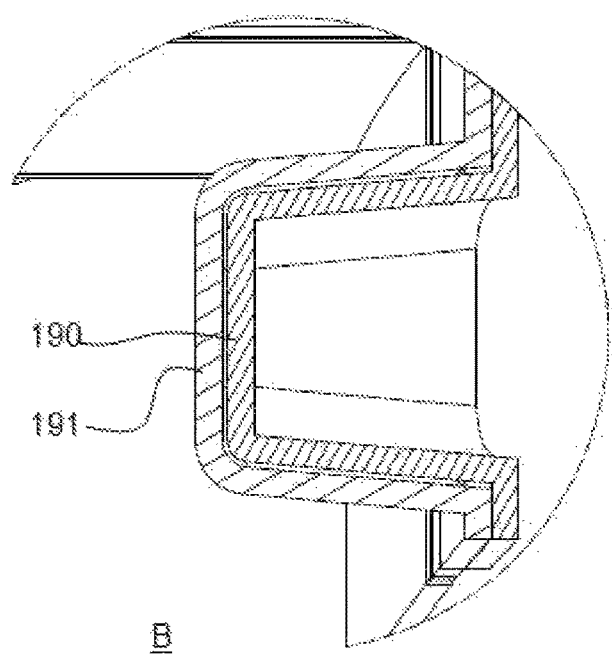
FIG. 7 illustrates a device for indexing the primary component of FIG. 2a and FIG. 2b with respect to the secondary component of FIG. 2a and FIG. 2b, according to one nonlimiting embodiment.
Figure 8:
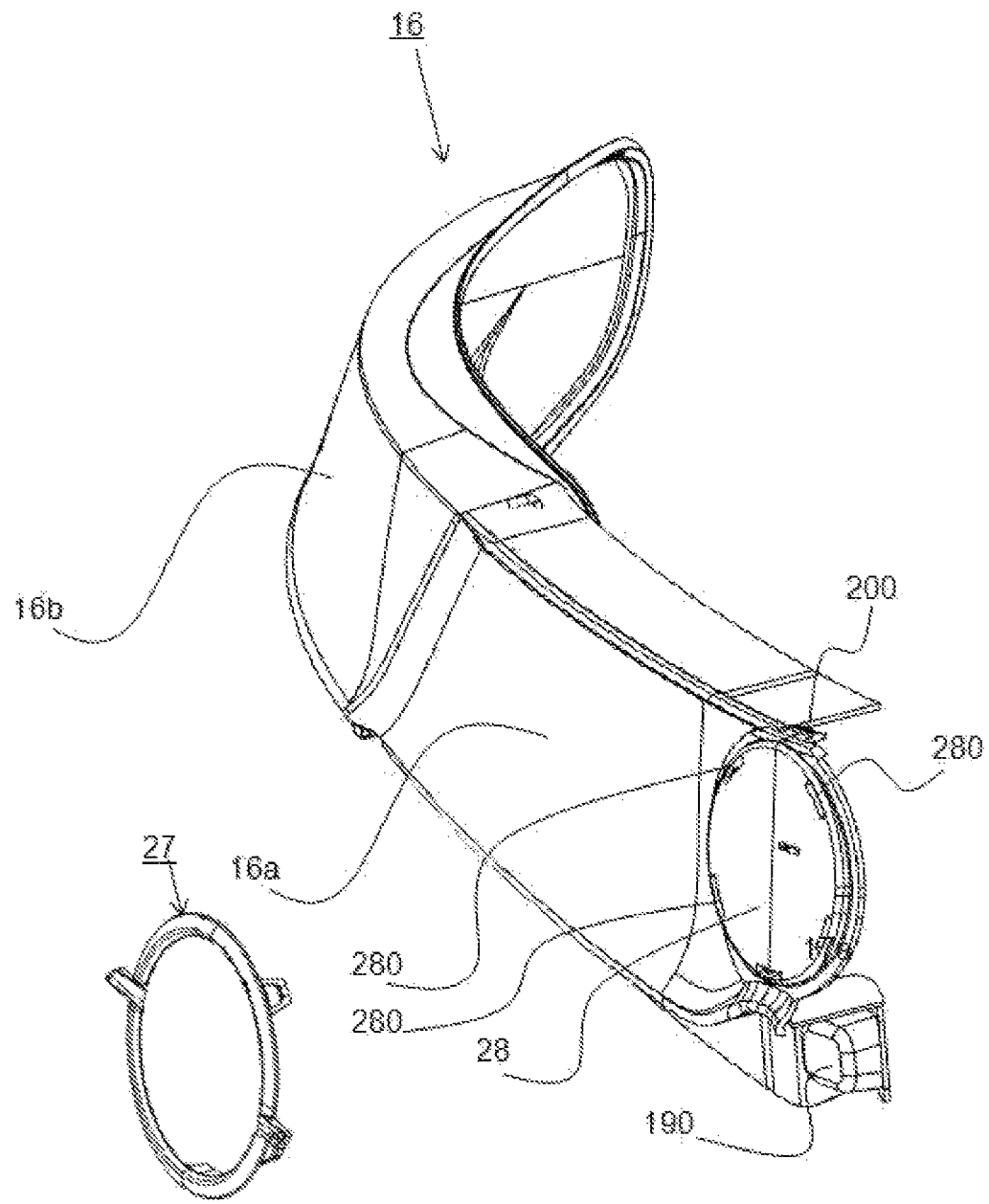
FIG. 8 illustrates the primary component of FIG. 4, the logo of said light assembly of FIG. 2a and FIG. 3, the mounting surface for the logo forming part of said primary component, according to a first nonlimiting embodiment.

As illustrated in FIG. 4, FIG. 7, FIG. 8 and FIG. 15, in one nonlimiting embodiment, the primary component 16 comprises an indexing device 190 for indexing on said secondary component 17. For its part, as illustrated in FIG. 4, FIG. 5 and FIG. 7, FIG. 15 and FIG. 16, the secondary component 17 comprises a counterpart 191 of the indexing device 190. In one nonlimiting variant embodiment, it is the first part 17*a* which comprises this counterpart 191. As illustrated in FIG. 7, in one nonlimiting embodiment, the indexing device 190 is a male part configured to be inserted into a female part 191, or vice versa. In one nonlimiting embodiment, the male part 190 is a closed well, and the female part 191 is a stud. In the nonlimiting example illustrated in FIG. 7, the male part 190 forms part of the primary component 16, and the female part 191 forms part of the secondary component 17.

In one nonlimiting embodiment, the indexing device 190 is situated at one end of the primary component 16. In the nonlimiting example illustrated, it is situated at the end of the first part 16*a*. In the nonlimiting example illustrated, the indexing device 190 is situated in the lower part of the primary component 16, while the fixing device 200 is situated in the upper part of the primary component 16. Thus, the indexing is done from the bottom, and the fixing from the top. Thus, the primary component 16 is positioned and fitted relative to the secondary component 17 from the bottom, then it is fixed to the secondary component 17 from the top via the fixing device 200.

As illustrated in FIG. 2*a*, FIG. 2*b* and FIG. 12, in one nonlimiting embodiment, said light assembly 1 further comprises an indexing device 31 for indexing on the body 40 of the vehicle. In one nonlimiting variant embodiment illustrated in the figures, the indexing device 31 comprises two pins.

The light assembly 1 is described below according to a first nonlimiting embodiment illustrated in FIG. 2*a*, FIG. 2*b*, FIG. 3, FIG. 4, FIG. 5, and FIG. 8.

According to this first nonlimiting embodiment, the primary component 16 and the secondary component 17 are assembled directly together to form the strip so as to have a one-piece visual appearance, the logo 27 being arranged in the center of said strip. By directly is meant that there is no intermediate part to assemble them.

According to this first nonlimiting embodiment, one of said primary component 16 or secondary component 17 comprises the mounting surface 28 for said logo 27. In this first nonlimiting embodiment, the logo 27 is thus integrated into one of the two components. The primary component 16 and the secondary component 17 are asymmetrical since one of them comprises the mounting surface 28 for the logo 27. In one nonlimiting variant embodiment illustrated in FIG. 3, FIG. 4 and FIG. 8, the primary component 16 comprises said mounting surface 28. Thus, since the mounting surface 28 comprises the fixing device 200 for fixing to the secondary component 17, the primary component 16 is directly fixed to the secondary component 17 via said mounting surface 28.

According to this first nonlimiting embodiment, in one nonlimiting embodiment illustrated in FIG. 2a, it is the mounting surface 28 which comprises the indexing device 31 for indexing on the body 40 of the vehicle. As illustrated in FIG. 2a, the indexing device 31 makes it possible to position the primary component 16 (in which the mounting surface 28 is integrated)-secondary component 17 (which is fixed to the primary component 16) assembly relative to the body 40 of the vehicle.

The light assembly 1 is described below according to a second nonlimiting embodiment illustrated in FIG. 2b, FIG. 14, FIG. 15, and FIG. 16.

According to this second nonlimiting embodiment, the primary component 16 and the secondary component 17 are not assembled directly together to form a strip, but are assembled together via a central structural part 30.

Figure 14:
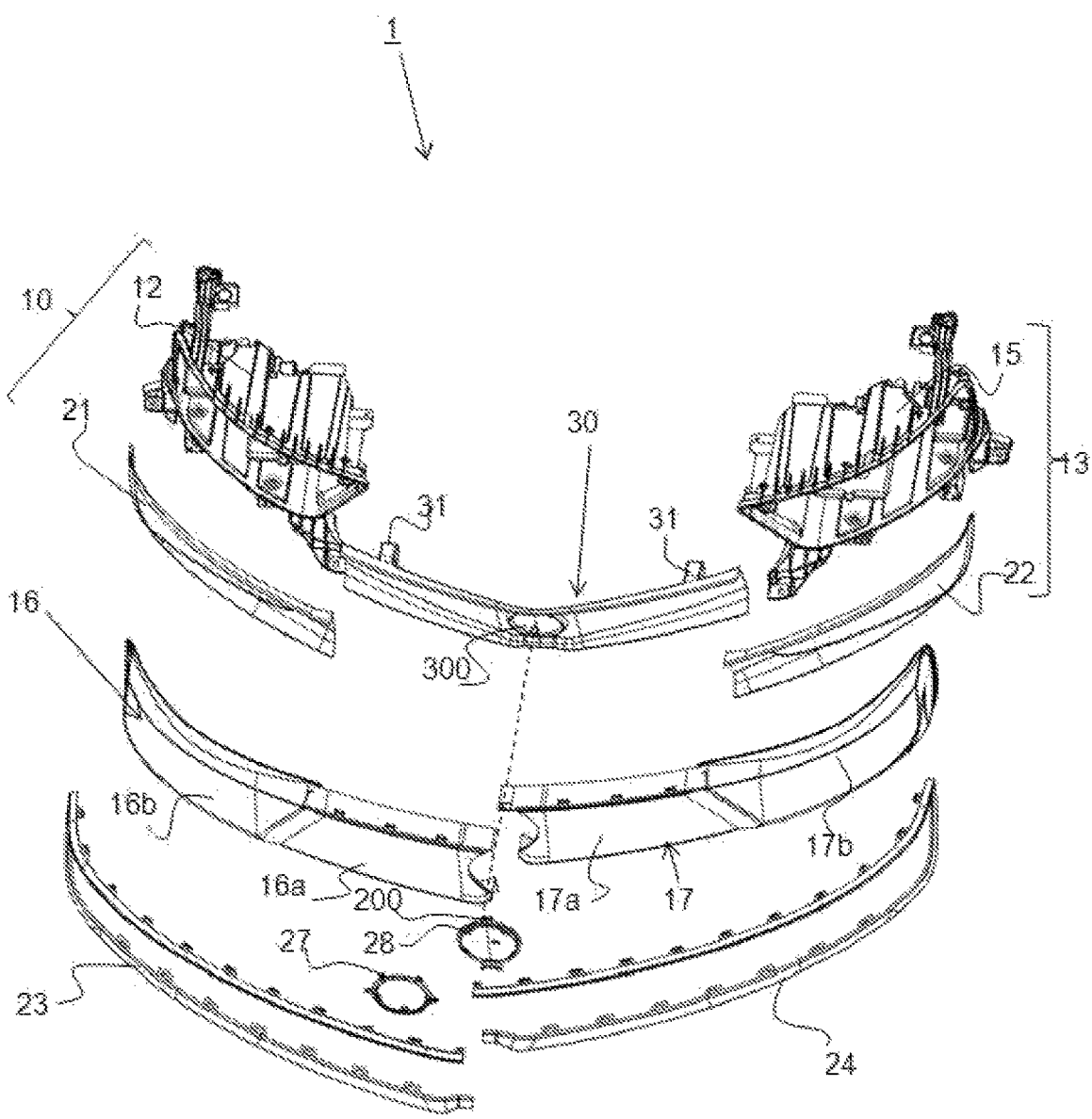
FIG. 14 is an exploded view of said light assembly of FIG. 2b, according to a second nonlimiting embodiment.

Thus, according to this second nonlimiting embodiment, as illustrated in FIG. 2b and FIG. 14, the light assembly 1 comprises a central structural part 30 comprising said mounting surface 28 for said logo 27. The mounting surface 28 is thus integrated into the central structure 30. The logo 27 is thus separated from the primary component 16 and from the secondary component 17. It is not integrated into one of the two components. The primary component 16 and the secondary component 17 are relatively symmetrical. As the mounting surface 28 comprises the fixing device 200 for fixing to the secondary component 17, the central structural part 30 is thus fixed to the secondary component 17 via said mounting surface 28.

In FIG. 14, the mounting surface 28 has been illustrated separately from the central structural part 30 to make it clearly visible. It fits into a location 300 of the central structural part 30 dedicated for this purpose.

Figure 15:
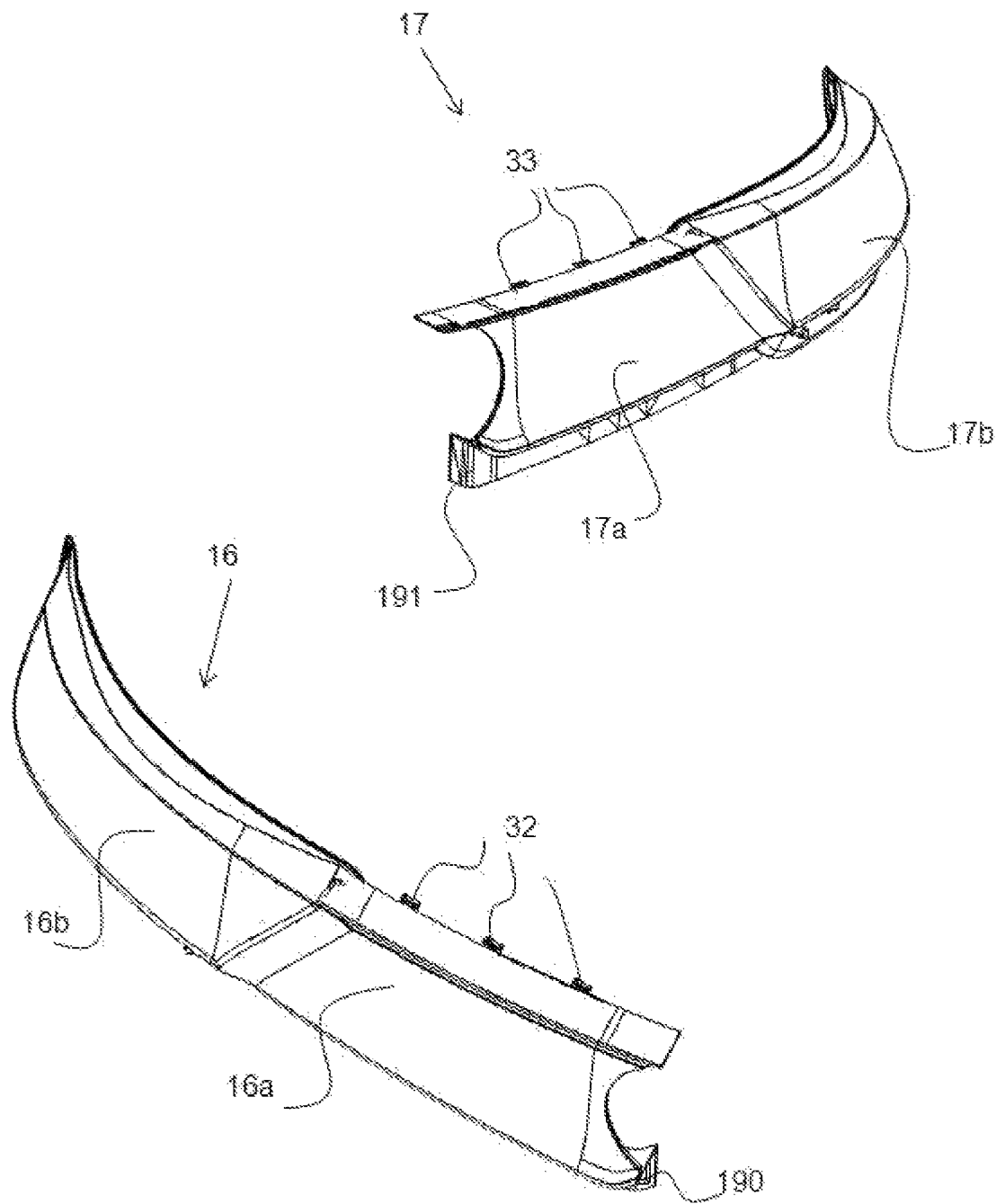
FIG. 15 illustrates said primary component and said one secondary component of said light assembly of FIG. 2b, according to one nonlimiting embodiment.
Figure 16:
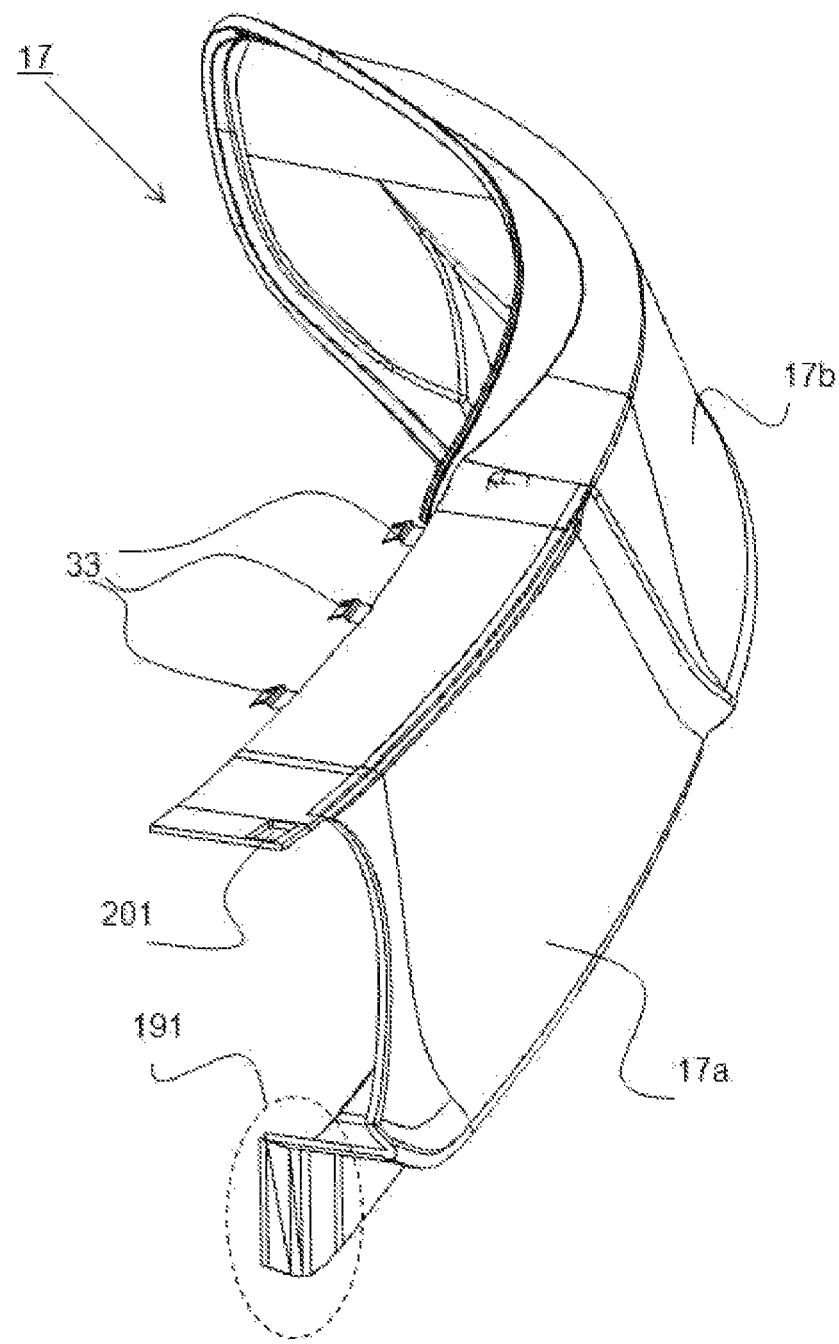
FIG. 16 is a zoomed-in view of said secondary component of FIG. 15, according to one nonlimiting embodiment.

In one nonlimiting embodiment illustrated in FIG. 15 and FIG. 16, the primary component 16 and the secondary component 17 further each comprise respectively a fixing device 32, 33 for fixing to the central structural part 30. In one nonlimiting embodiment illustrated in FIG. 15 and FIG. 16, the fixing device 32, 33 respectively of the primary component 16 and of the secondary component 17 comprises at least one fixing lug. In the nonlimiting example illustrated, it comprises three fixing lugs which will be inserted into a slot (not illustrated) of the central structural part 30. The primary component 16 and the secondary component 17 are thus clipped onto the central structural part 30.

When they are assembled on the central structural part 30, the primary component 16 and the secondary component 17 form a strip with a logo 27 in the center of said strip so as to have a one-piece visual appearance.

According to this second nonlimiting embodiment, in one nonlimiting embodiment illustrated in FIG. 14, it is the central structural part 30 which comprises the indexing device 31 for indexing on the body 40 of the vehicle. As illustrated in FIG. 2b, the indexing device 31 makes it possible to position the primary component 16 (which is fixed to the central structural part 30)-central structural part 30-secondary component 17 (which is fixed to the central structural part 30) assembly with respect to the body 40 of the vehicle.

Of course, the description of the invention is not limited to the embodiments described above and to the field described above. Thus, in another nonlimiting embodiment, only one of the first part 16a or of the second part 16b of the primary component 16 may be adhesively bonded to the primary housing 12. Similarly, only one of the first part 17a or of the second part 17b of the secondary component 17 may be adhesively bonded to the secondary housing 15. Thus, in another nonlimiting embodiment, the primary component 16 and the secondary component 17 are made of PMMA (polymethyl methacrylate). Thus, in another nonlimiting embodiment, the fixing lugs of the fixing device 32 for fixing to the central structural part 30 may be replaced by fixing screws. The same is true for the fixing lugs of the fixing device 33 for fixing to the central structural part 30. On the other hand, the term logo must be understood in a very broad sense, that is to say as an additional part which may or may not represent a distinctive sign representative of a brand. It could also be a shield positioned in front of a driving aid sensor.

Thus, the invention described has in particular the following advantages:
  compared with the prior art, it makes it possible to form a strip with two parts instead of three parts so as to have a one-piece visual appearance,
  it makes it possible to easily assemble the two parts thanks to the indexing device 190,
  it makes it possible to easily assemble the two parts thanks to the indexing device 190; there is no longer any problem with fitting due to mechanical clearances,
  it makes it possible to have a logo integrated into the strip,
  it makes it possible to have good sealing of the strip formed by the primary component 16 and the secondary component 17 with the primary light device 10 and the secondary light device 13; thus, there is no risk of a fluid entering the primary light device 10 and the secondary light device 13.

What is claimed is:

1. A light assembly of a vehicle, the light assembly comprising:
  a primary light device including a primary light module with primary style mask arranged in a primary housing,
  a secondary light device including a secondary light module with secondary style mask arranged in a secondary housing,
  a primary component comprising a first part and a second part, with the second part being transparent,
  a secondary component comprising a first part and a second part, with the second part being transparent, where one of the primary component or secondary component includes an indexing device configured to position one of the primary component or secondary component relative to the other of the secondary component or primary component and one of the primary component or secondary component partially covering the other of the primary component or secondary component,
  a logo, and
  a mounting surface for the logo, with the mounting surface including a fixing device for fixing to one of the primary component or secondary component.

2. The light assembly as claimed in claim 1, wherein:
  the first part of the primary component is opaque, semi-opaque or transparent,
  the first part of the secondary component is opaque, semi-opaque or transparent.

3. The light assembly as claimed in claim 1, wherein the indexing device is a male part configured to be inserted into a female part, or vice versa.

4. The light assembly as claimed in claim 3, wherein the male part is a closed well, and the female part is a stud.

5. The light assembly as claimed in claim 1, wherein the first part and the second part of the primary component are overmolded.

6. The light assembly as claimed in claim 1, further comprising a primary style part and a secondary style part configured to be fastened respectively to the primary component and to the secondary component.

7. The light assembly as claimed in claim 1, further comprising a second indexing device for indexing on a body of the vehicle.

8. The light assembly as claimed in claim 7, wherein the mounting surface includes the second indexing device for indexing on the body of the vehicle.

9. The light assembly as claimed in claim 1, wherein one of the primary component or secondary component includes the mounting surface for the logo.

10. The light assembly as claimed in claim 1, further comprising a central structural part including the mounting surface for said logo.

11. The light assembly as claimed in claim 10, wherein the central structural part includes a second indexing device for indexing on a body of the vehicle.

12. The light assembly of a vehicle as claimed in claim 1, wherein the primary light device and the secondary light device are vehicle front headlights or vehicle taillights.

13. The light assembly as claimed in claim 1, wherein the first part and the second part of the secondary component are overmolded.

14. A light assembly of a vehicle, the light assembly comprising:
- a primary light device including a primary light module arranged in a primary housing,
- a secondary light device including a secondary light module arranged in a secondary housing,
- a primary component comprising a first part and a second part, with the second part being transparent,
- a secondary component comprising a first part and a second part, with the second part being transparent, where one of the primary component or secondary component includes an indexing device configured to position one of the primary component or secondary component relative to the other of the secondary component or primary component and one of the primary component or secondary component partially covering the other of the primary component or secondary component,
- a logo, and
- a mounting surface for the logo, with the mounting surface including a fixing device for fixing to one of the primary component or secondary component and a second indexing device for indexing on a body of the vehicle.

\* \* \* \* \*